(12) United States Patent  
Matsushita et al.

(10) Patent No.: US 6,501,440 B2
(45) Date of Patent: Dec. 31, 2002

(54) IC CARD, ANTENNA FRAME FOR IC CARD AND METHOD FOR MANUFACTURING THE SAME

(75) Inventors: Yoshitaka Matsushita, Nagano (JP); Tsutomu Higuchi, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 0 days.

(21) Appl. No.: 09/946,238

(22) Filed: Sep. 5, 2001

(65) Prior Publication Data

US 2002/0057221 A1 May 16, 2002

(30) Foreign Application Priority Data

Sep. 14, 2000 (JP) ........................................ 2000-279813

(51) Int. Cl.⁷ ................................................ H01Q 3/22
(52) U.S. Cl. .................................. 343/895; 343/700 MS
(58) Field of Search .......................... 343/895, 700 MS; 361/813; 523/124, 122, 125; 136/256, 252, 258

(56) References Cited

U.S. PATENT DOCUMENTS

| 5,744,516 A | * | 4/1998 | Hashitani et al. | ........... 523/124 |
| 5,946,198 A | | 8/1999 | Hopp et al. | ................. 361/813 |
| 6,222,118 B1 | * | 4/2001 | Matsushita et al. | ......... 136/256 |

* cited by examiner

*Primary Examiner*—Hoanganh Le
*Assistant Examiner*—James Clinger
(74) *Attorney, Agent, or Firm*—Paul & Paul

(57) ABSTRACT

An IC card includes an antenna formed as a flat coil wound several times having an inner vacant area, said antenna being made by punching or etching a thin metal strip and having an outermost loop partially connected to and supported by an outer frame of said thin metal strip, and said antenna having respective innermost and outermost terminals. A semiconductor element is electrically connected to said innermost and outermost terminals, respectively. One of said innermost and outermost terminals having an accommodation hole in which said semiconductor element is accommodated. The semiconductor element and the antenna are supported to maintain their form by a supporting material made of biodegradable resin.

16 Claims, 14 Drawing Sheets

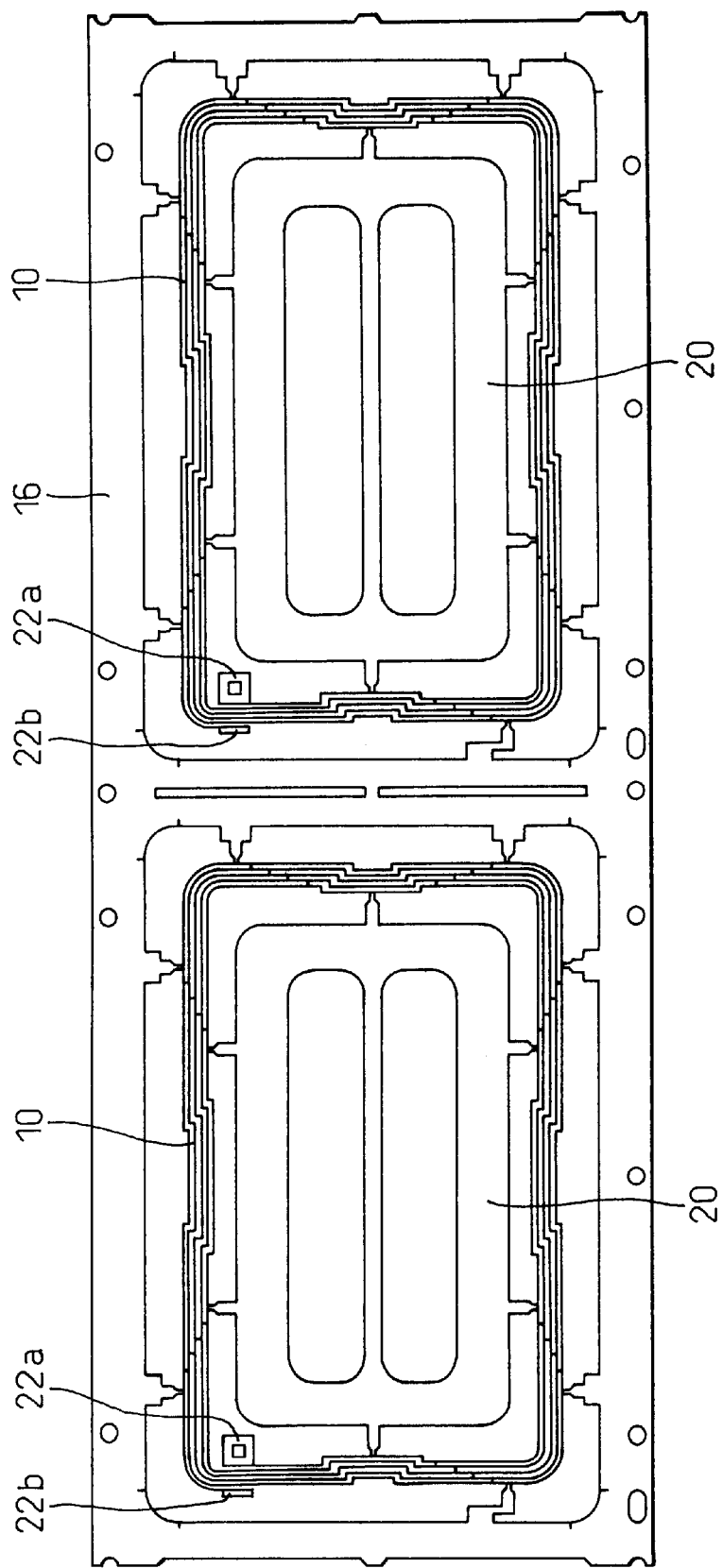

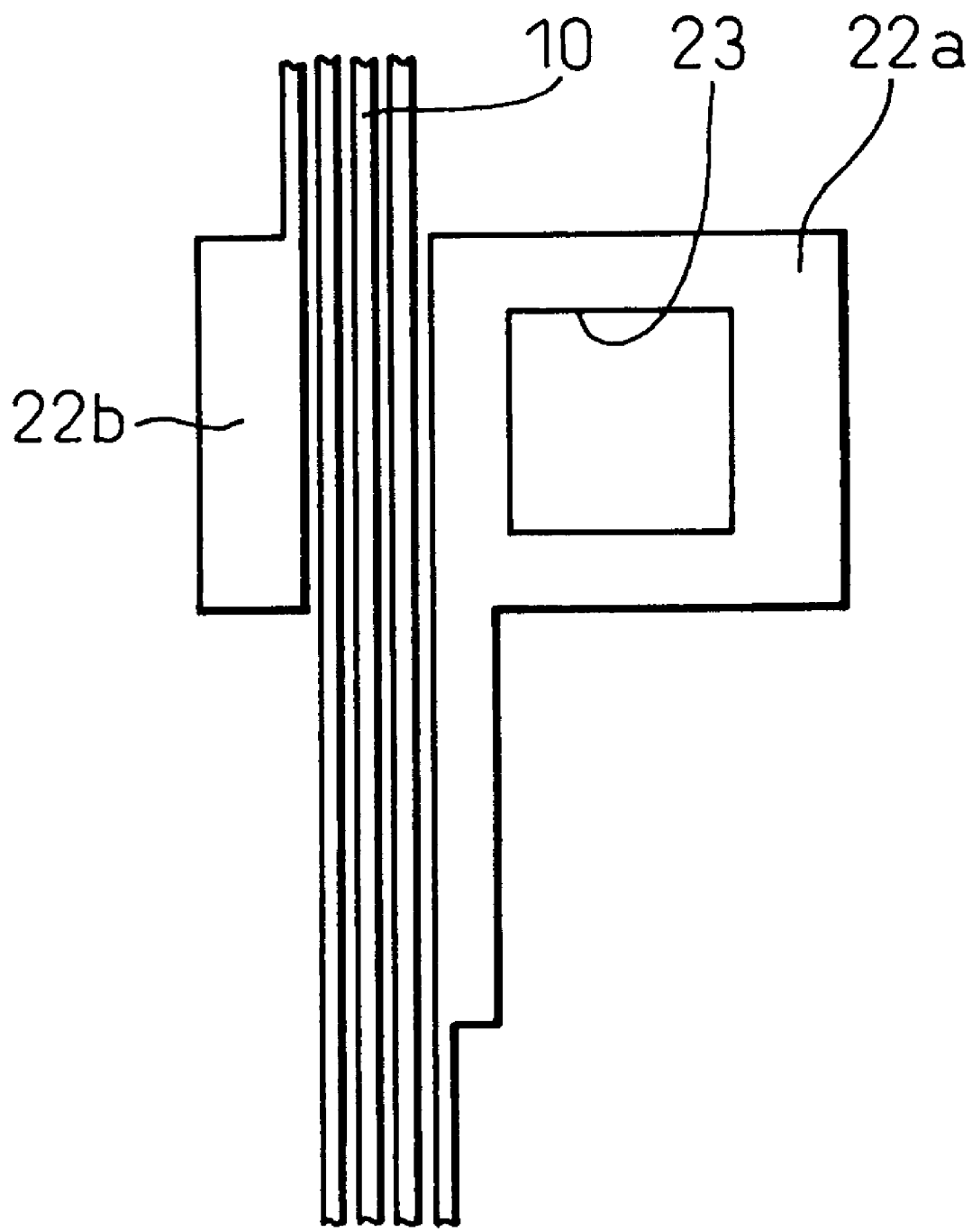

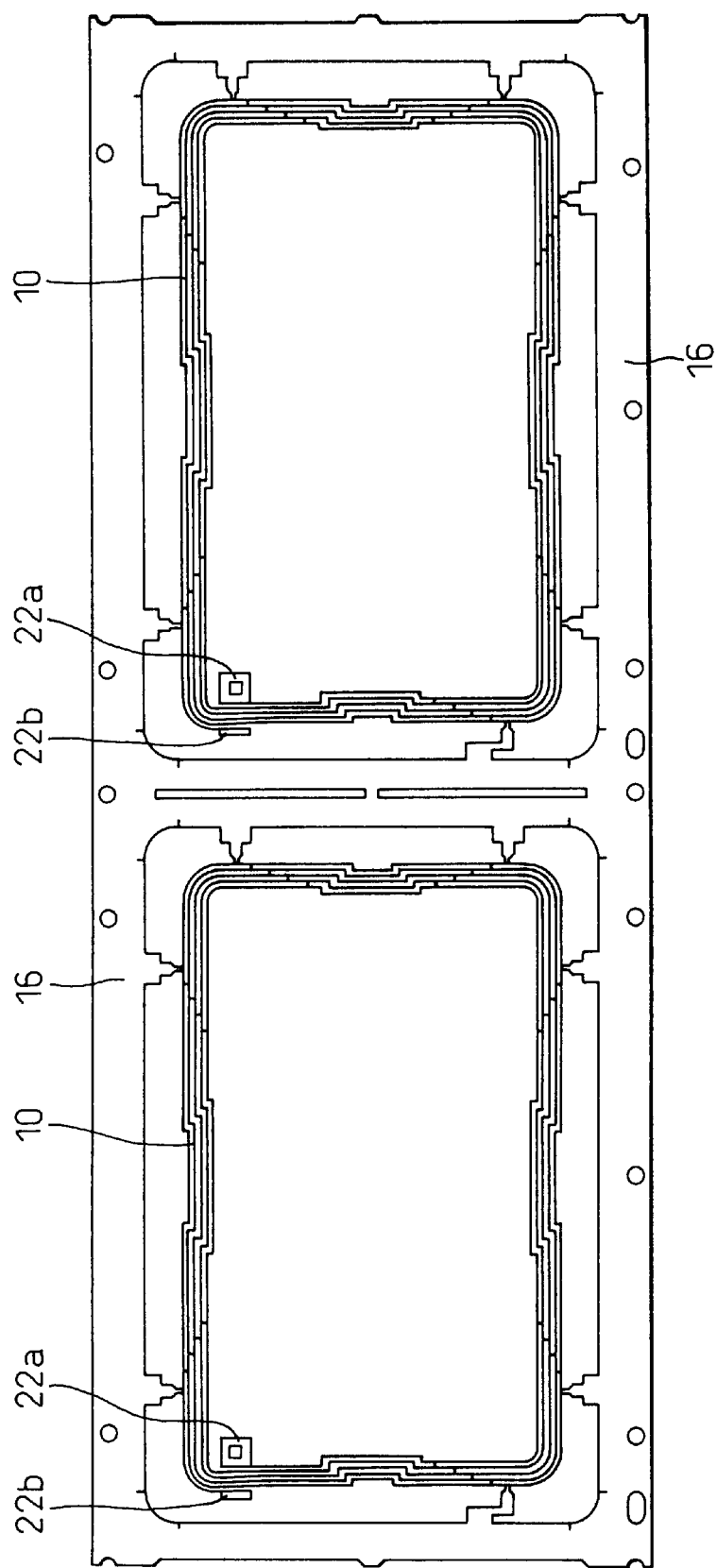

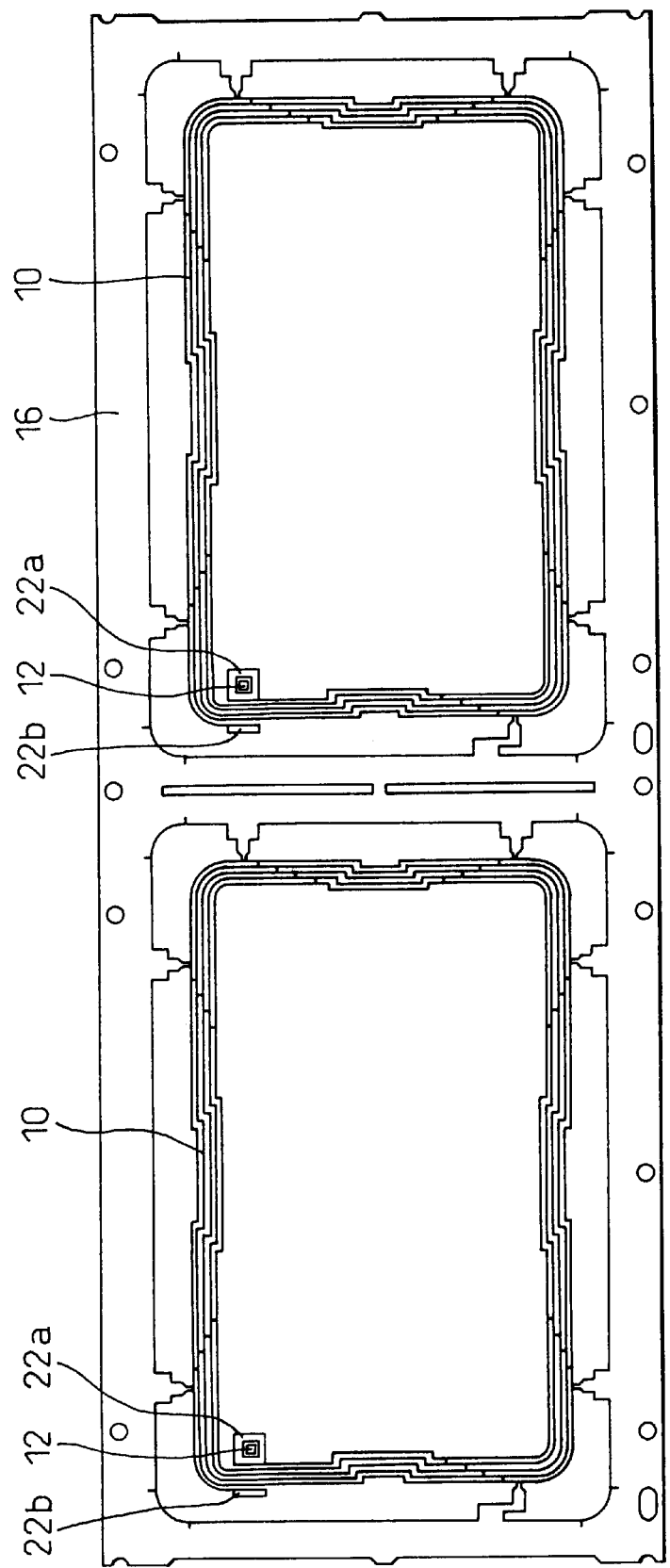

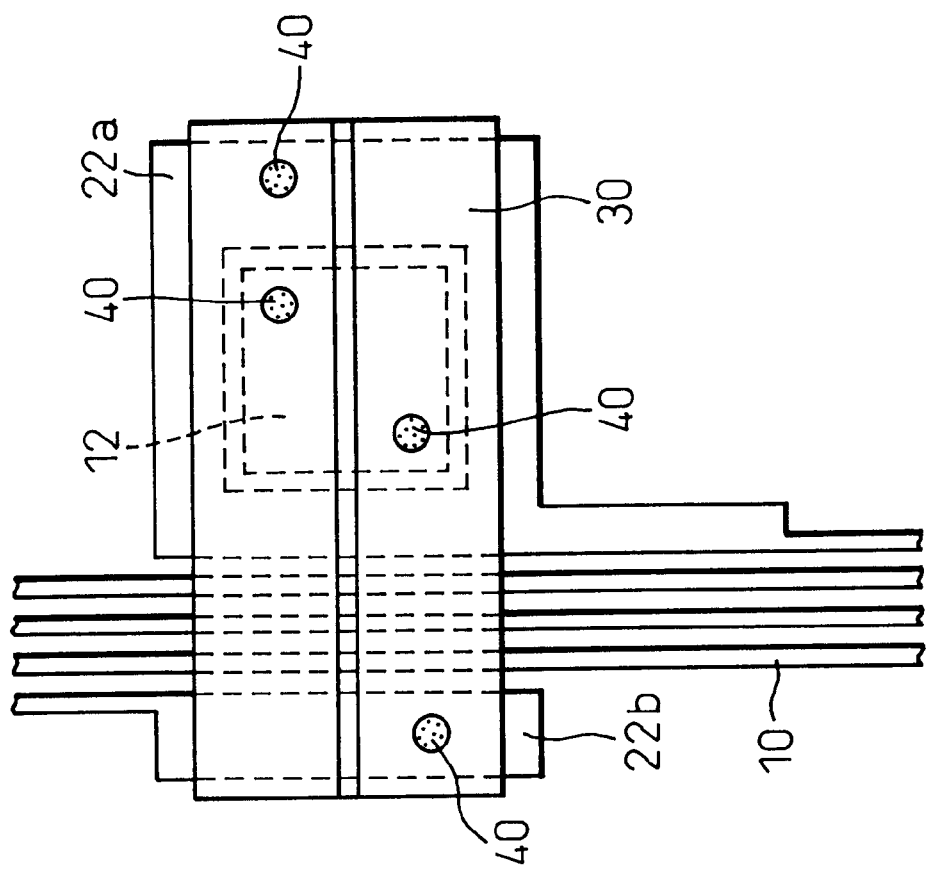
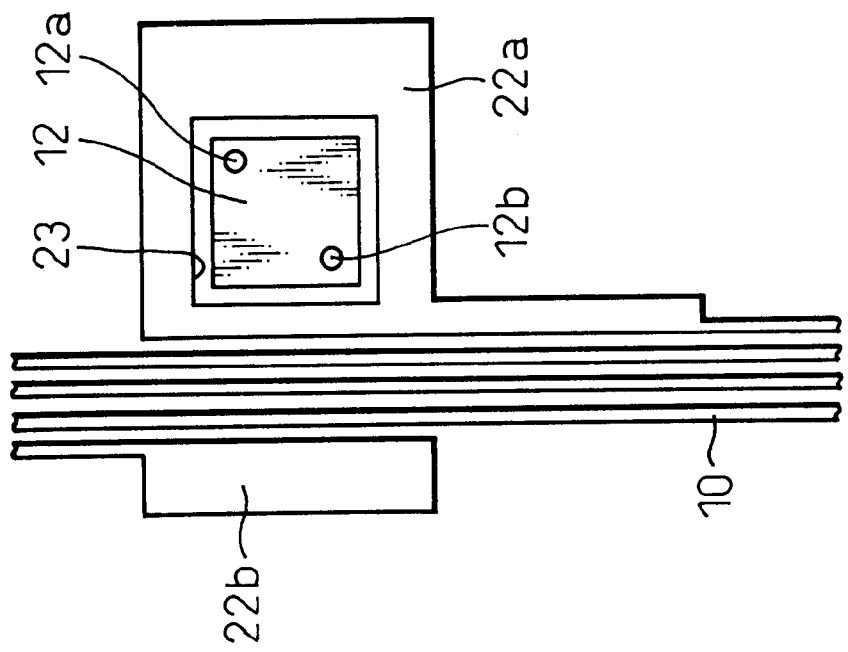

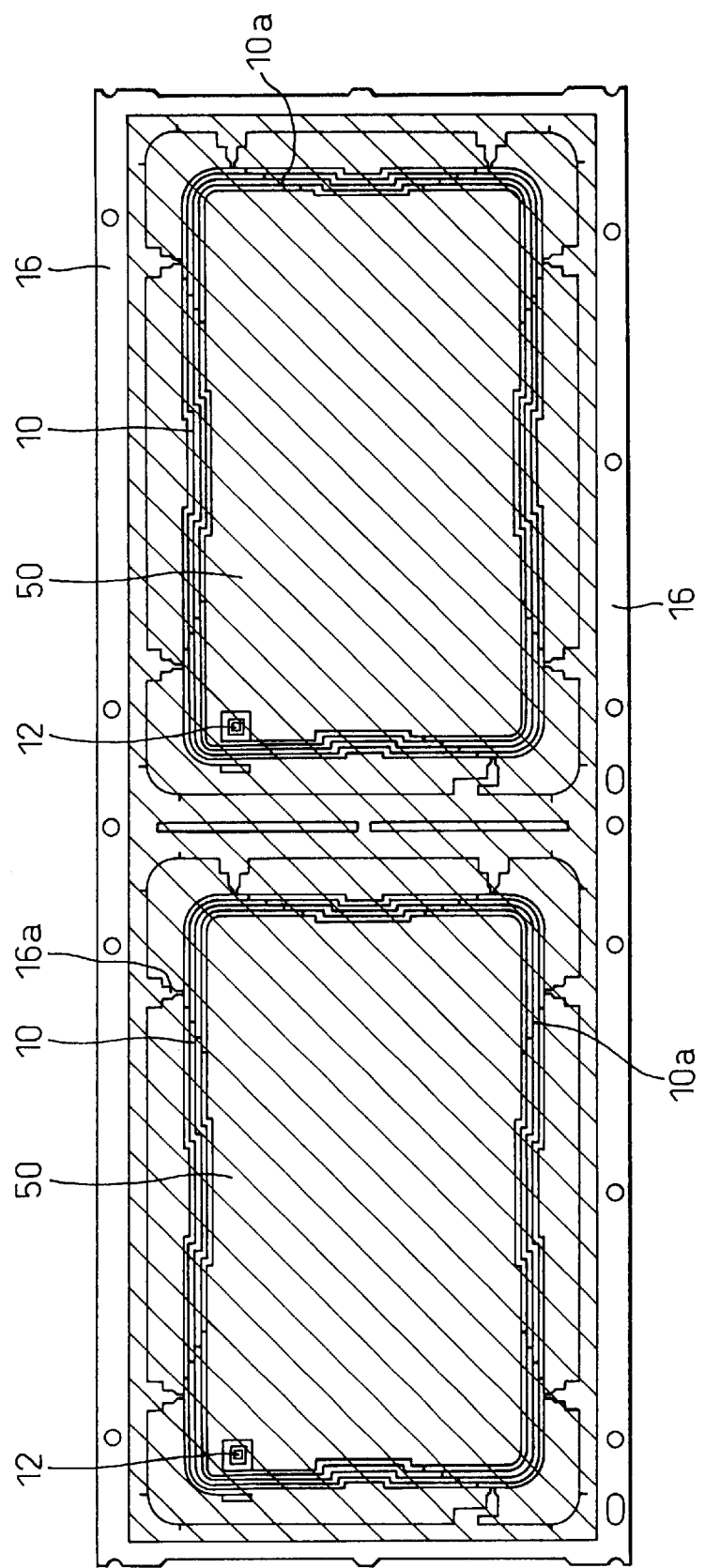

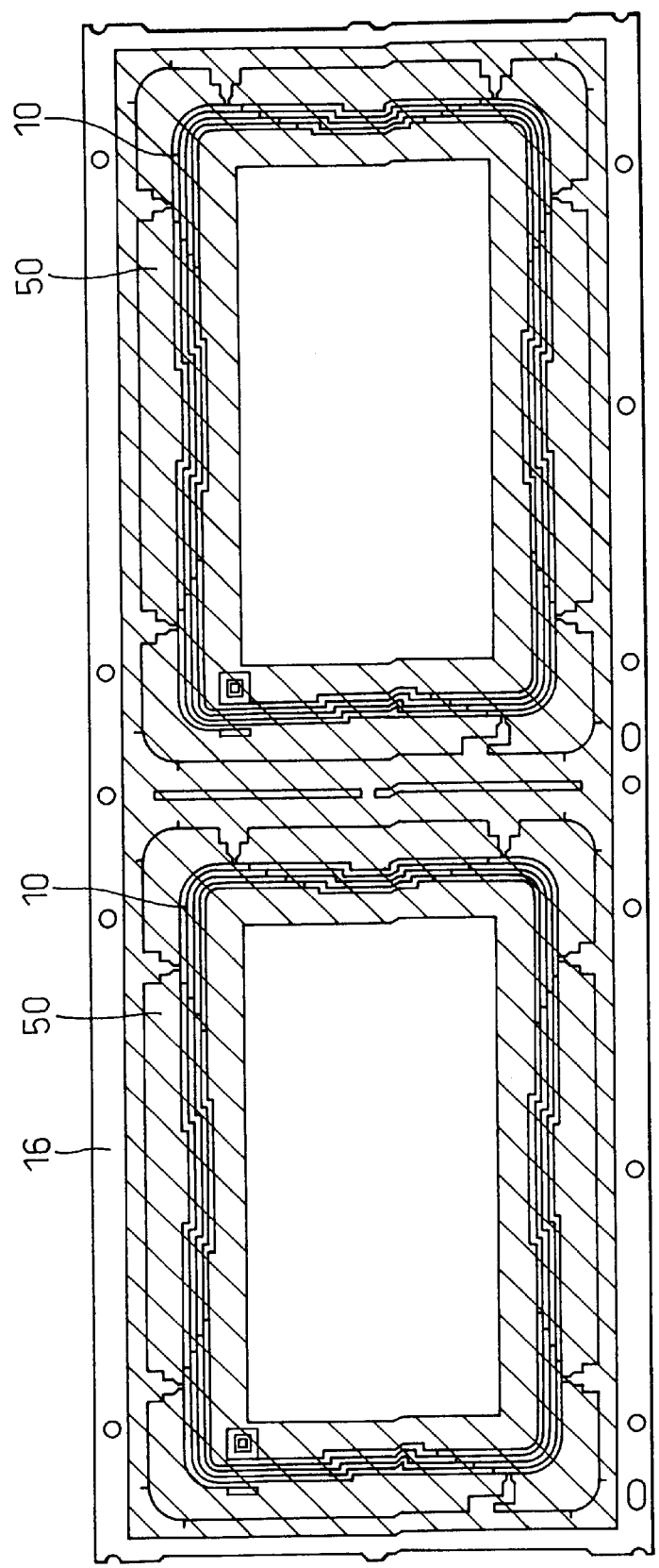

IC CARD, ANTENNA FRAME FOR IC CARD AND METHOD FOR MANUFACTURING THE SAME

BACKGROUND OF THE INVENTION

1. Field of the Invention

The present invention relates to an antenna frame, an integrated circuit (IC) card and a manufacturing method thereof. The antenna frame is used for IC cards or IC tags which are generally called "IC cards" in this specification hereinafter and send and receive signals using a non-contact system. More particularly, the present invention relates to an IC card and manufacturing method thereof, the characteristic feature of which is the method of holding an antenna of the IC card.

2. Description of the Related Art

The IC card is composed as follows. A semiconductor element is electrically connected with and mounted on an antenna which is formed into a flat coil-shape, for sending and receiving signals, and a film which forms the outside of the IC card is laminated on both sides of the antenna and semiconductor element. In this connection, there is provided a tag product which is used for the discrimination of baggage, and this tag product is similar to the IC card. In the same manner as that of the IC card, this tag product is composed in such a manner that a semiconductor element is mounted on an antenna and a film is laminated on both sides of the antenna and semiconductor element. In the same manner as that of the IC card, the tag product is advantageous in that information can be sent and received in a non-contact system so that baggage can be effectively discriminated. In this connection, in this specification, the IC card includes a product such a tag product which is provided with an antenna and semiconductor element and is capable of sending and receiving a signal using a non-contact system.

When the IC card is manufactured, a metal sheet is subjected to punching or etching so that the metal sheet can be formed into a predetermined coil-shape antenna, and a semiconductor element is electrically connected with and mounted on the antenna, and then a film is laminated on both sides of the antenna and semiconductor element. FIG. 16 is a view showing a state in which a metal sheet is subjected to punching and formed into an antenna 10, and a semiconductor element 12 is mounted on the antenna 10. In this case, the tape 14 is made to adhere to the antenna 10 as a support member so that the coil-shaped antenna 10 cannot be deformed in the case of conveying the antenna or laminating the film on both sides of the antenna and semiconductor element. The periphery of the antenna 10 is supported by the frame 16.

FIG. 17 is a view showing an example in which the antenna 10 and the semiconductor element 12 are interposed between the protective films 18 on both sides. The protective films 18 may be previously removed before the outside film for the IC card is laminated. Alternatively, the protective films 18 may be left being interposed between the outside film and the antenna 10 and semiconductor element 12.

In this connection, it can be considered that a very large number of IC cards are used and discarded after they have been used. Due to the foregoing, as the number of the used IC cards has increased, disposal of the IC cards becomes a big problem. As described before, according to the conventional method of manufacturing the IC card, the tape 14 and the protective film 18 are used to prevent the antenna from being moved, and further the film is laminated outside the antenna 10. The tape 14, protective film 18 and film, which covers the outside of the IC card, are made of synthetic resin such as polyvinyl chloride (PVC) or polyethylene terephthalate (PET). These synthetic resins used for the conventional IC card cannot be easily degraded in the nature. Even when these synthetic resins are incinerated, various environmental problems may be caused.

SUMMARY OF THE INVENTION

The present invention has been accomplished by considering a IC card which will be consumed in large quantities. It is an object of the present invention to provide an antenna frame used for the IC card, IC card and preferable manufacturing method thereof, characterized in that: the IC card can be easily discarded at low cost without affecting the natural environment; the IC card can be mass-produced because the manufacturing cost is low; and the IC card can be effectively used for many purposes.

According to the present invention there is provided an IC card comprising: a semiconductor element; an antenna electrically connected to said semiconductor element; and a supporting material for supporting said semiconductor element and said antenna, said supporting material being made of biodegradable resin.

The antenna is made of a material which can be easily oxidized and eroded. Particularly, the antenna is made of iron.

The antenna is a flat coil wound several times having an inner vacant area. A whole surface of said flat coil including said inner vacant area is entirely supported by said supporting material. Otherwise, the whole surface of said flat coil except for said inner vacant area is entirely supported by said supporting material.

An IC card further comprises a pair of films laminated to respective surfaces of said flat coil and said semiconductor element to form outer surfaces of said IC card and said pair of films are made of biodegradable resin or paper.

According to another aspect of the present invention, there is provided a method for manufacturing an IC card comprising the following steps of: mounting a semiconductor element on an antenna and electrically connecting said semiconductor element to said antenna; and supporting said semiconductor element and said antenna by means of supporting material made of biodegradable resin.

The supporting material is made of liquid-like or paste-like biodegradable resin and said method further comprises: coating said antenna with said supporting material.

The supporting material is made of granular biodegradable resin and said method further comprises: melting said supporting material to support said antenna.

The antenna is a flat coil wound several times having an inner vacant area. In this case, the method comprises the following steps of: mounting a semiconductor element on said flat coil and electrically connecting said semiconductor element to said flat coil; arranging a pair of supporting sheets made of biodegradable resin over respective sides of said flat coil and said semiconductor element; and pressing said pair of supporting sheets toward said flat coil and said semiconductor element.

The method further comprises a step of: laminating a pair of films, made of biodegradable resin or paper, to respective surfaces of said flat coil and said semiconductor element to form external surfaces of said IC card.

According to a still another aspect of the present invention, there is provided an antenna frame used for an IC card comprising: an antenna formed as a flat coil wound several times having an inner vacant area, said antenna being made by punching or etching a thin metal strip and having an outermost loop partially connected to and supported by an outer frame of said thin metal strip, and said antenna having respective innermost and outermost terminals; one of said innermost and outermost terminals having an accommodation hole in which a semiconductor element is to be accommodated; and supporting material for supporting said antenna to maintain its shape, said supporting material being made of biodegradable resin.

In accordance with a further aspect of the present invention, there is provided an IC card comprising: an antenna formed as a flat coil wound several times having an inner vacant area, said antenna being made by punching or etching a thin metal strip and having an outermost loop partially connected to and supported by an outer frame of said thin metal strip, and said antenna having respective innermost and outermost terminals; a semiconductor element electrically connected to said innermost and outermost terminals, respectively; one of said innermost and outermost terminals having an accommodation hole in which said semiconductor element is accommodated; and supporting material for supporting said semiconductor element and said antenna to maintain their form, said supporting material being made of biodegradable resin.

The IC card further comprises a wiring pattern film for electrically connecting terminals of said semiconductor element to said innermost and outermost terminals of the antenna, respectively.

The IC card further comprises a pair of films laminated to respective surfaces of said flat coil and said semiconductor element to form external surfaces of said IC card and said pair of films are made of biodegradable resin or paper.

BRIEF DESCRIPTION OF THE DRAWINGS

FIG. 1 is a plan view showing a state in which an antenna is supported by a frame;

FIG. 2 is an enlarged schematic illustration showing a connection terminal formed in an antenna;

FIG. 3 is a plan view showing a state in which an inside frame is removed;

FIG. 4 is a plan view showing a state in which a semiconductor element is mounted on an antenna;

FIGS. 5(a) and 5(b) are schematic illustrations showing a method of mounting a semiconductor element on an antenna;

FIG. 9 is a plan view showing a state in which biodegradable resin is laminated on an antenna;

FIG. 10 is a schematic illustration showing a state in which an antenna is held by biodegradable resin in a frame-shape;

DETAILED DESCRIPTION OF THE PREFERRED EMBODIMENTS

Figure 6A:
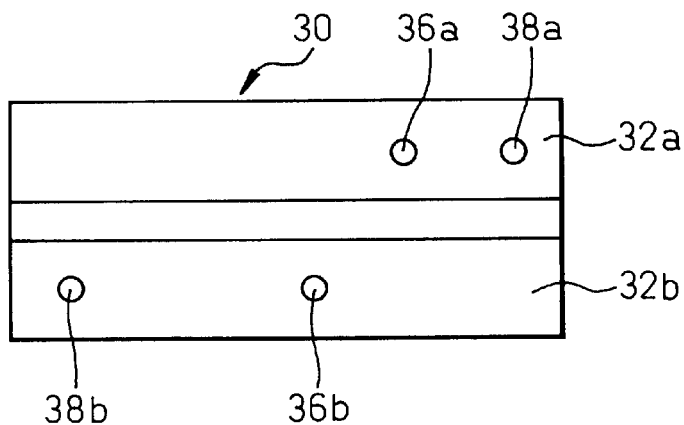
FIG. 6(a) is a plan view of a wiring pattern film.

It should be understood by those skilled in the art that the foregoing description relates to only a preferred embodiment of the disclosed invention, and that various changes and modifications may be made to the invention without departing the sprit and scope thereof.

Referring to the appended drawings, a preferable embodiments of the present invention will be explained in detail below.

FIGS. 1 to 14 are views showing a method of manufacturing an IC card of the present invention. FIG. 1 is a view showing an antenna frame used for an IC card in which an antenna 10 is formed by punching or etching of a metal sheet. In this embodiment, the metal sheet is made of material such as iron which can be easily obtained at low price and further can be easily oxidized and corroded so that the IC card can be easily discarded after the use. When a metal sheet is subjected to punching, it is easy to form a flat coil-shaped antenna 10 of a fine pattern from a metal sheet. It is also easy to mass-produce the antennae 10 from an elongated metal strip.

FIG. 1 is a view showing a state in which two antennae 10 are formed on the frame 16 while being connected with each other. It is possible to provide a frame in which three or more antennas 10 are formed in the longitudinal direction while being connected with each other. In the structure shown in FIG. 1, the outer peripheral sections of the antennas 10 are held by the frame 16, and the inner peripheral sections of the antennae 10 are held by the inner frame 20.

Reference numerals 22a, 22b are connection terminals for electrically connecting the antenna 10 with the electrode terminals of the semiconductor element 12. The connection terminal 22a is formed at the end of the inner peripheral section of the antenna 10, and the connection terminal 22b is formed at the end of the outer peripheral section of the antenna 10. FIG. 2 is an enlarged view of the connection terminals 22a, 22b. The connection terminals 22a, 22b are arranged at positions opposed to each other in such a manner that the lead of the coil-shaped antenna is interposed between the connection terminals 22a, 22b. In one 22a of the connection terminals, there is provided an accommodation hole 23 for accommodating a semiconductor element 12.

Next, the inner frame 20 is removed from the antenna 10 by cutting the connecting section by which the inner frame 20 has been connected with the inner peripheral section of the antenna 10. FIG. 3 is a view showing a state in which the inner frame 20 is removed.

Next, the semiconductor element 12 is mounted on the antenna 10. FIG. 4 is a view showing a state in which the semiconductor element 12 is mounted on the antenna 10. In this embodiment, the electrode terminals of the semiconductor element 12 and the connection terminals 22a, 22b are electrically connected with each other by the wiring pattern film.

FIGS. 5(a) to 7(b) are views showing a method of electrically connecting the semiconductor element 12 with the connection terminals 22a, 22b. FIG. 5(a) is a view showing a state in which the semiconductor element 12 is arranged in the accommodation hole 23 formed in the connection terminal 22a. Reference numerals 12a, 12b are electrode terminals of the semiconductor element 12. The electrode terminals 12a, 12b are electrically connected with the respective connection terminals 22a, 22b. FIG. 5(b) is a view showing a state in which the wiring pattern film 30 is made to adhere to the connection terminals 22a and 22b in such a manner that the wiring pattern film 30 crosses a lead of the antenna so that the connection terminals 22a, 22b are electrically connected with the semiconductor element 12.

Figure 6B:
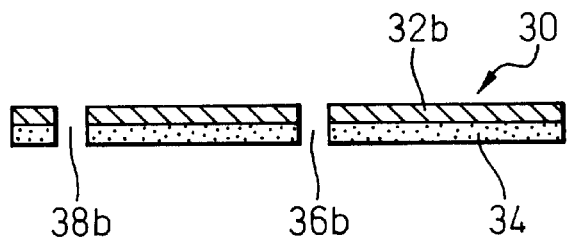
FIG. 6(b) is a cross-sectional view of a wiring pattern film.

FIG. 6(a) is a plan view of the wiring pattern film 30, and FIG. 6(b) is a cross-sectional view of the wiring pattern film 30. On the wiring pattern film 30, there are provided wiring patterns 32a, 32b, which are made of a conductive material such as copper, on the surface of the adhesive layer 34 having an electrically insulating property. As shown in FIG. 6(a), the wiring patterns 32a, 32b are divided from each other in the width direction of the film. On the wiring patterns 32a, 32b, there are provided through-holes 36a, 36b, the positions of which agree with the positions of the electrode terminals 12a, 12b, respectively. On the wiring patterns 32a, 32b, there are provided through-holes 38a, 38b, the positions of which agree with the connecting positions of the connection terminals 22a, 22b.

Figure 7A:
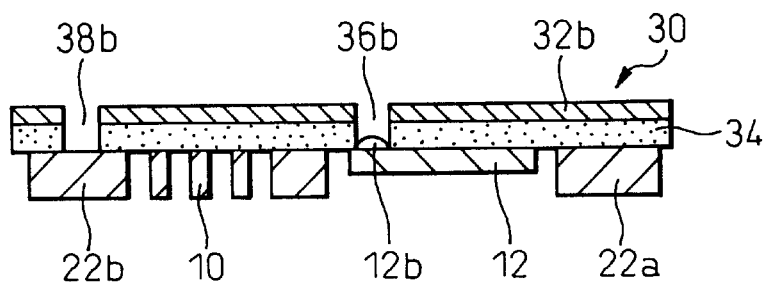
FIGS. 7(a) and 7(b) are schematic illustrations showing a method of electrically connecting a semiconductor element with a connection terminal by a wiring pattern film.
Figure 7B:
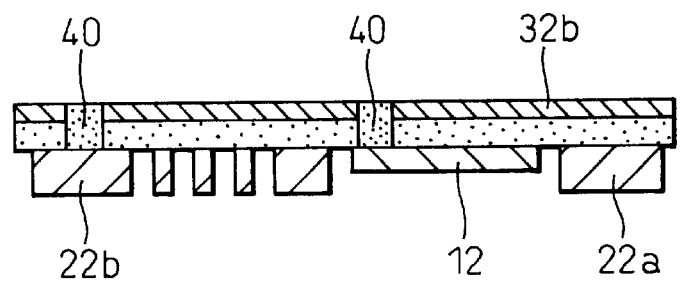

FIGS. 7(a) and 7(b) are cross-sectional views showing a method of electrically connecting the connection terminals 22a, 22b with the semiconductor element 12 by making the connection terminals 22a, 22b adhere to the wiring pattern film 30. FIG. 7(a) is a view showing a state in which the wiring pattern film 30 is made to adhere to the connection terminals 22a, 22b via the adhesive layer 34. A bump formed in the electrode terminal 12b of the semiconductor element 12 is inserted into the through-hole 36b, and the through-hole 38b is arranged so as to be positioned on the connection terminal 22b.

FIG. 7(b) is a view showing a state in which the conductive paste 40 is filled in each through-hole 36a, 36b, 38a, 38b formed on the wiring pattern film 30. When each through-hole 36a, 36b, 38a, 38b is filled with the conductive paste 40, the connection terminals 22a, 22b and the electrode terminals 12a, 12b of the semiconductor element 12 are electrically connected to each other by the wiring patterns 32a, 32b. In this way, the semiconductor element 12 is mounted while being connected with the antenna 10.

Figure 8A:
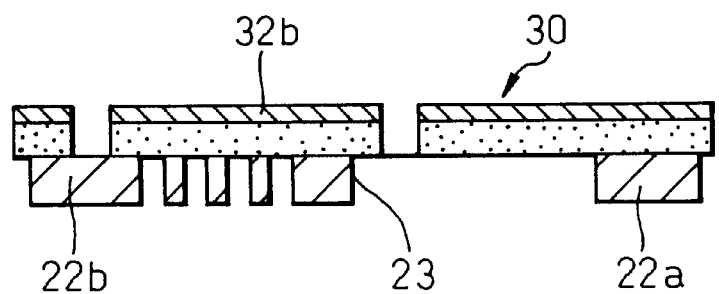
FIGS. 8(a) to 8(c) are schematic illustrations showing another method of electrically connecting a semiconductor element with a connection terminal by a wiring pattern film.
Figure 8B:
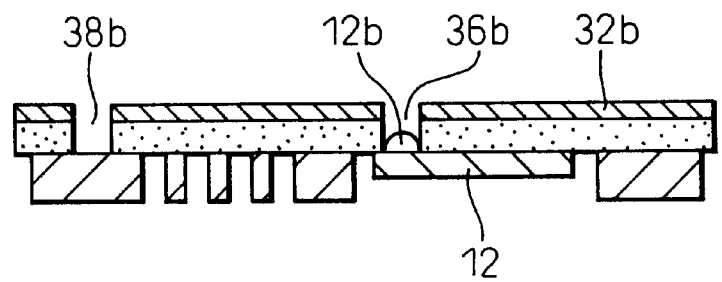
Figure 8C:
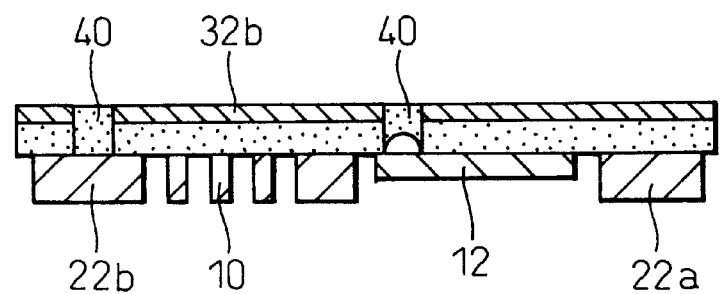

FIGS. 8(a) to 8(c) are views showing another method of mounting the semiconductor element 12 on the antenna using the wiring pattern film 30. According to the method described before, after the semiconductor element 12 has been arranged in the accommodation hole 23 of the connection terminal 22a, the wiring pattern film 30 is made to adhere to the connection terminals 22a, 22b. However, according to this method, after the wiring pattern film 30 has been made to adhere to the connection terminals 22a, 22b, the electrode terminals 12a, 12b are positioned to the through-holes 36a, 36b, the semiconductor element 12 is made to adhere, and then the conductive paste 40 is filled into the through-holes 36a, 36b, 38a, 38b. The conductive paste 40 is used for electrically connecting the electrode terminals 12a, 12b of the semiconductor element 12 with the wiring patterns 32a, 32b. Other conductive materials apart from the conductive paste 40 can be appropriately used.

As shown in the present embodiment, the method of connecting the semiconductor element 12 with the connection terminals 22a, 22b by using the wiring pattern film is advantageous in that the semiconductor element 12 can be easily positioned to the wiring pattern film when the semiconductor element 12 is accommodated in one 22a of the connection terminals formed into a frame-shape, so that the assembling operation can be easily carried out. Also, the method is advantageous in that the connection section, in which the semiconductor element 12 is connected with the connection terminals 22a, 22b, can be made thin when the wiring pattern is used. Also, the method is advantageous in that the conductive paste 40 can be easily filled in the through-holes 36a, 36b, 38a, 38b.

In this connection, in the above embodiment, in the inner peripheral section of the antenna 10, the connection terminal 22a is formed in which the accommodation hole 23 for accommodating the semiconductor element 12 is formed. However, it is possible to form a connection terminal, in which the accommodation hole 23 for accommodating the semiconductor element 12 is formed, in the outer peripheral section of the antenna 10.

After the semiconductor element 12 has been mounted on the antenna 10 as described above, both faces of the antenna 10 and the semiconductor element 12 are laminated on each other by the support member made of the biodegradable resin 50. In this connection, in the case where the antenna 10 is laminated by the support member made of the biodegradable resin 50, only one face of the antenna 10 and the semiconductor element 12 can be laminated and supported. FIG. 9 is a view showing a state in which the antenna 10 is laminated by the biodegradable resin 50. In this embodiment, all the regions including the inner region of the antenna 10 are laminated by the biodegradable resin 50. However, it is possible for the antenna 10 to be partially laminated and held. FIG. 10 is a view showing an example in which after all the regions of the antenna 10 have been laminated by the biodegradable resin 50, the inner region of the antenna 10 is punched so that the antenna 10 is supported in a frame-shape. The smaller the region for holding the antenna 10 by the biodegradable resin 50 is, the thinner the IC card can be made in the case of forming the IC card.

Figure 11:
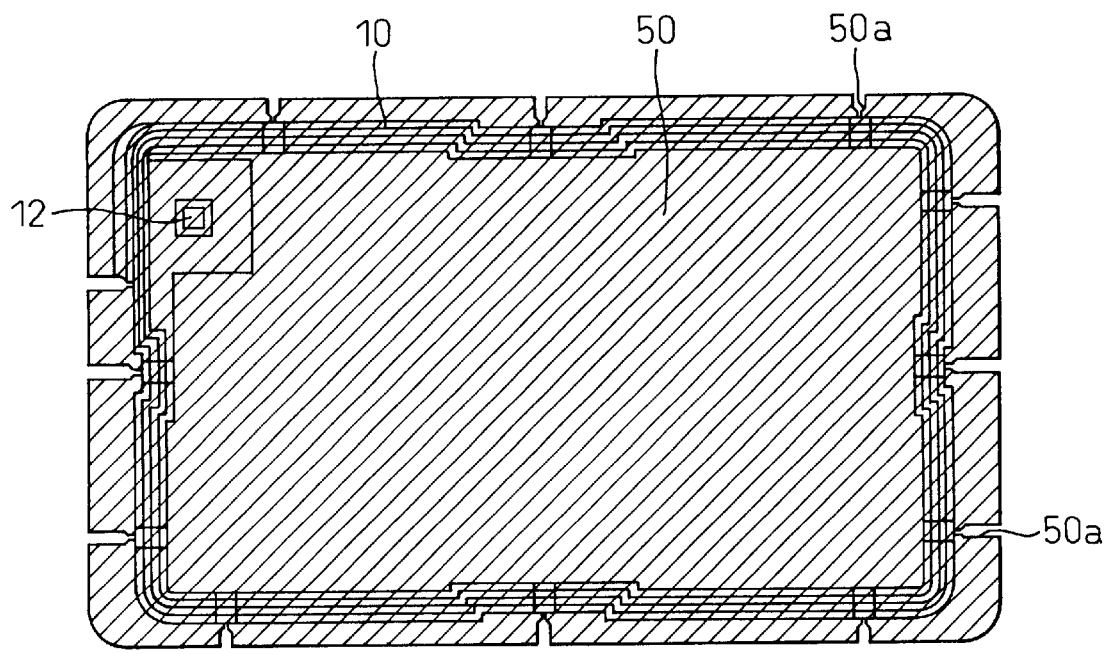
FIG. 11 is a plan view showing a state in which an antenna is divided into individual pieces.

After the antenna 10 has been laminated by the biodegradable resin 50, the connecting section 16a (hanging section) of the outer peripheral section with the frame 16 and the connecting section 10a for connecting the antenna coils adjacent to each other are separated from each other and the biodegradable resin 50 is cut off along the outer peripheral edge of the antenna 10. In this way, the antenna 10 is separated from the frame 16. FIG. 11 is a view showing an antenna 10 which has been separated from the frame 16. Since the connecting section 16a of the antenna 10 with the frame 16 is punched and also the connecting section 10a for connecting the antenna coils adjacent to each other is punched, the cutout portion 50a and the punched hole are formed in the support member of biodegradable resin 50. The semiconductor element 12 mounted on the antenna 10 is also held by the biodegradable resin 50.

Figure 12:
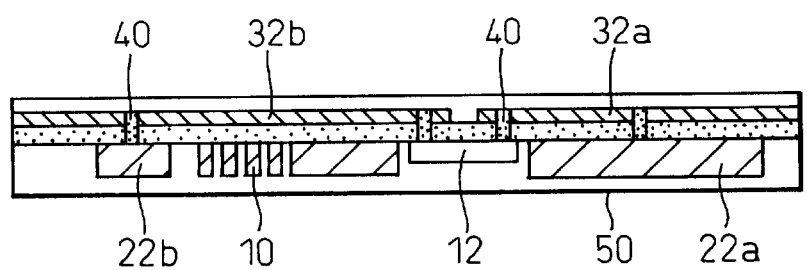
FIG. 12 is a cross-sectional view showing a state in which a neighborhood, on which a semiconductor element is mounted, is laminated by biodegradable resin.

FIG. 12 is an enlarged cross-sectional view showing the connecting section of the connecting terminals 22a, 22b of the antenna 10, which has been laminated by the biodegradable resin 50, with the connecting section of the semiconductor element 12. The connecting terminals 22a, 22b and the semiconductor element 12 are electrically connected with each other by the wiring patterns 32a, 32b, and the outside of the connecting section is covered with the biodegradable resin 50.

After the antenna 10 has been separated, the antenna 10 is further laminated by the film 60 which is arranged outside the IC card. Then the IC card is formed into a predetermined profile. In this way, the IC card can be produced.

Figure 13:
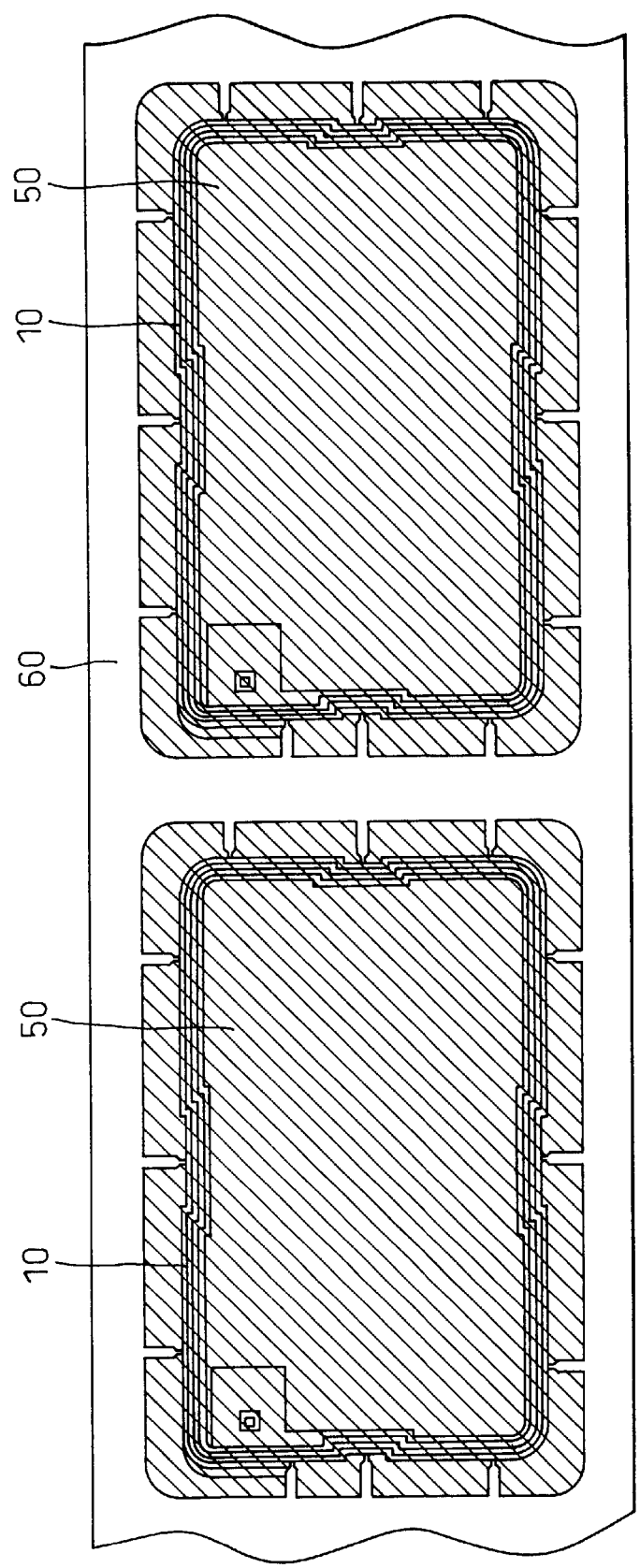
FIG. 13 is a plan view showing a state in which an antenna is laminated by a film which becomes the outside of an IC card.

FIG. 13 is a view showing a state in which the film 60 arranged outside the IC card is laminated. A film of resin such as polyethylene terephthalate (PET) is preferably used for the film 60 arranged outside the IC card. Also, biodegradable material such as biodegradable resin or paper is preferably used for the film 60 arranged outside the IC card. The antenna 10 is held by the biodegradable resin 50, and the biodegradable resin 50 acts as an adhesive agent. Therefore, it unnecessary to apply an adhesive agent when the film 60 to be arranged outside the IC card is laminated.

Figure 14:
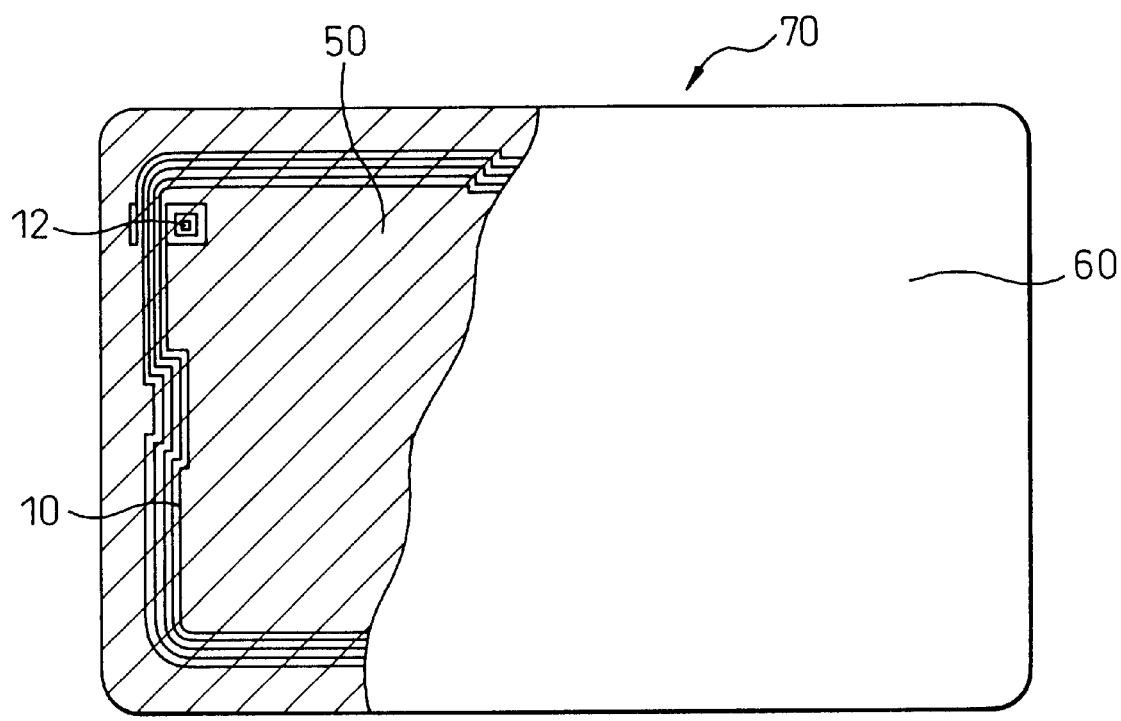
FIG. 14 is a plan view of an IC card.

FIG. 14 is a view showing the IC card 70 which has been finally obtained. The antenna 10 and the semiconductor element 12, which are held by the biodegradable resin 50, are interposed between the films 60 arranged outside the IC card 70. In this way, the IC card is formed into a predetermined profile.

The structure of the IC card of this embodiment is primarily characterized in that the biodegradable resin 50 is used for holding the antenna 10 and preventing the antenna 10 from being shifted from a predetermined position. The biodegradable resin 50 is a film which can be decomposed by the action of microorganisms. Therefore, when the antenna 10 is held by the biodegradable resin 50, the IC card can be discarded without having a bad influence on the natural environment.

When the biodegradable resin 50 is used as material for holding the antenna 10 and further, when material which is easily decomposed such as iron is used for the antenna 10 itself and furthermore, when material which is easily subjected to biodegradable such as paper is used for the outside film of the IC card, the biodegradable resin 50, antenna 10 and outside film of the IC card 70 are naturally decomposed when the IC card 70 is simply discarded without being subjected to a special treatment such as incineration. In this connection, depending upon a case, it is also possible to make the film, which is arranged outside the card, of a biodegradable resin 50.

Even in the case where the antenna 10 is made of iron which can be easily decomposed, since the antenna 10 is airtightly closed by the biodegradable resin 50 or the outside film in a normal condition of use, there is no possibility that the antenna 10 becomes rusty. Therefore, appearance of the product is not affected. On the other hand, in the case where the IC card is discarded into the ground, the biodegradable resin 50 is decomposed in a few weeks by the action of microorganisms, so that the antenna arranged inside the IC card can be decomposed.

In this connection, it is necessary for the biodegradable resin 50, which is used for assembling the IC card, to have a predetermined profile-holding property so that the biodegradable resin 50 can be preferably used for mass production.

The biodegradable resin used for assembling the IC card can be made of various products such as polyester synthetic resin, cellulose derivative and starch derivative. In this embodiment, the biodegradable resin 50 is made from corn. The physical property of the biodegradable resin used in these embodiments are shown as follows. In this case, the physical property is shown with respect to films A and B. In these specific examples A and B, the material is made of corn starch.

TABLE 1

| Film | Density (g/cm³) | Softening temperature | Tensile elastic modulus | Tensile strength | Melting viscosity | Equilibrium moisture |
|---|---|---|---|---|---|---|
| Film A | 1.18 | 80° C. | 3200 | 190 | 4550 | 0.8 |
| Film B | 1.19 | 64° C. | 4200 | 210 | — | 1.3 |

On Table 1, values are shown in the case where the thickness is 400 µm. The unit of tensile elastic modulus is kgf/cm², the unit of tensile strength is kgf, and the unit of melting viscosity is poise. The biodegradable resin is decomposed in about 60 days.

The biodegradable resin 50 used in these embodiments can be thermally deposited at low temperatures. When the antenna 10 is interposed and thermally pressed between the films of the biodegradable resin 50, it is easy for the biodegradable resin 50 to be laminated on the antenna 10.

Figure 15:
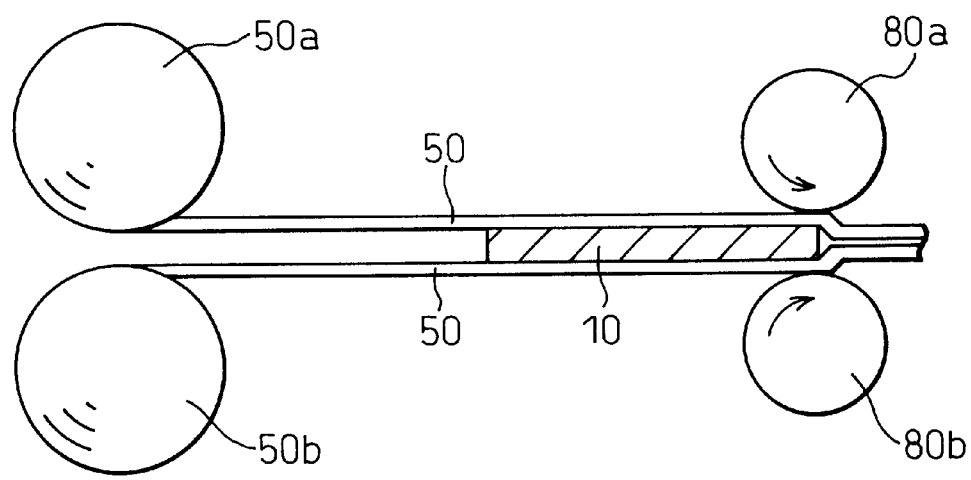
FIG. 15 is a schematic illustration showing an outline of the structure of a device for laminating biodegradable resin which is formed into a sheet-shape on an antenna.
Figure 16:
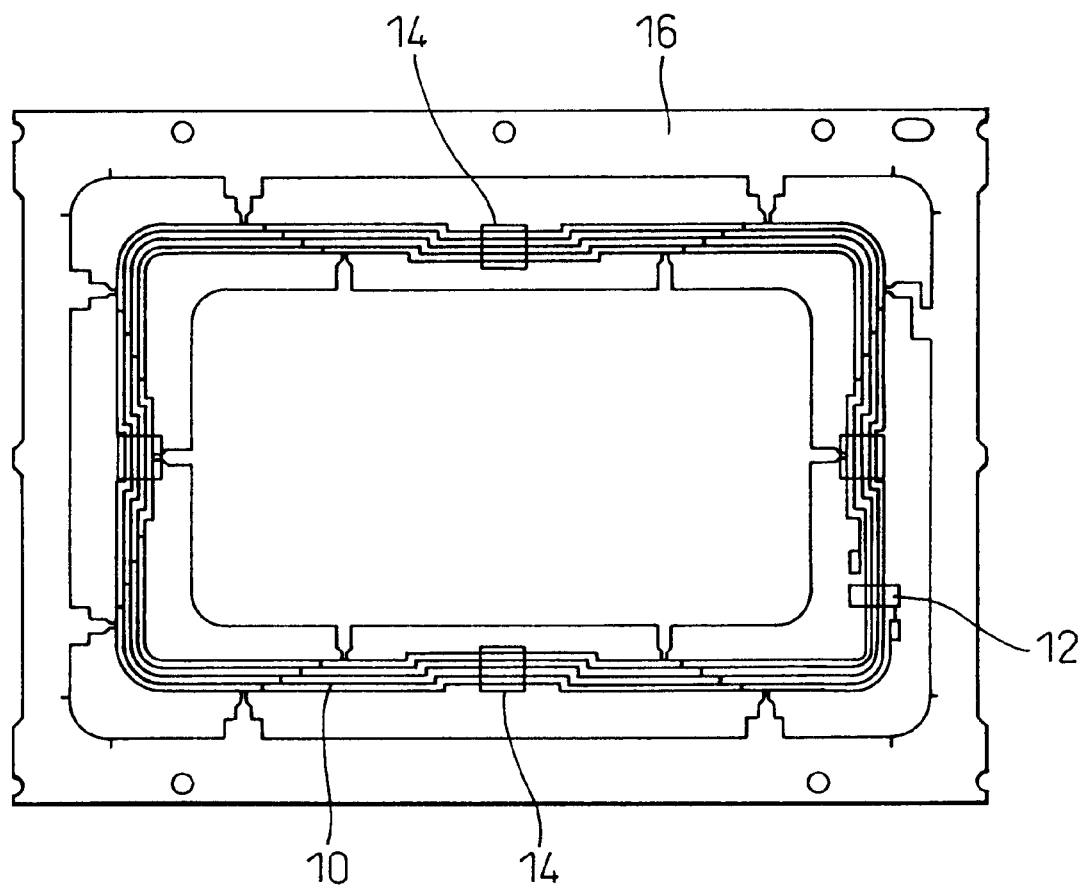
FIG. 16 is a plan view showing a state in which an antenna is partially held with a tape by a conventional method.
Figure 17:
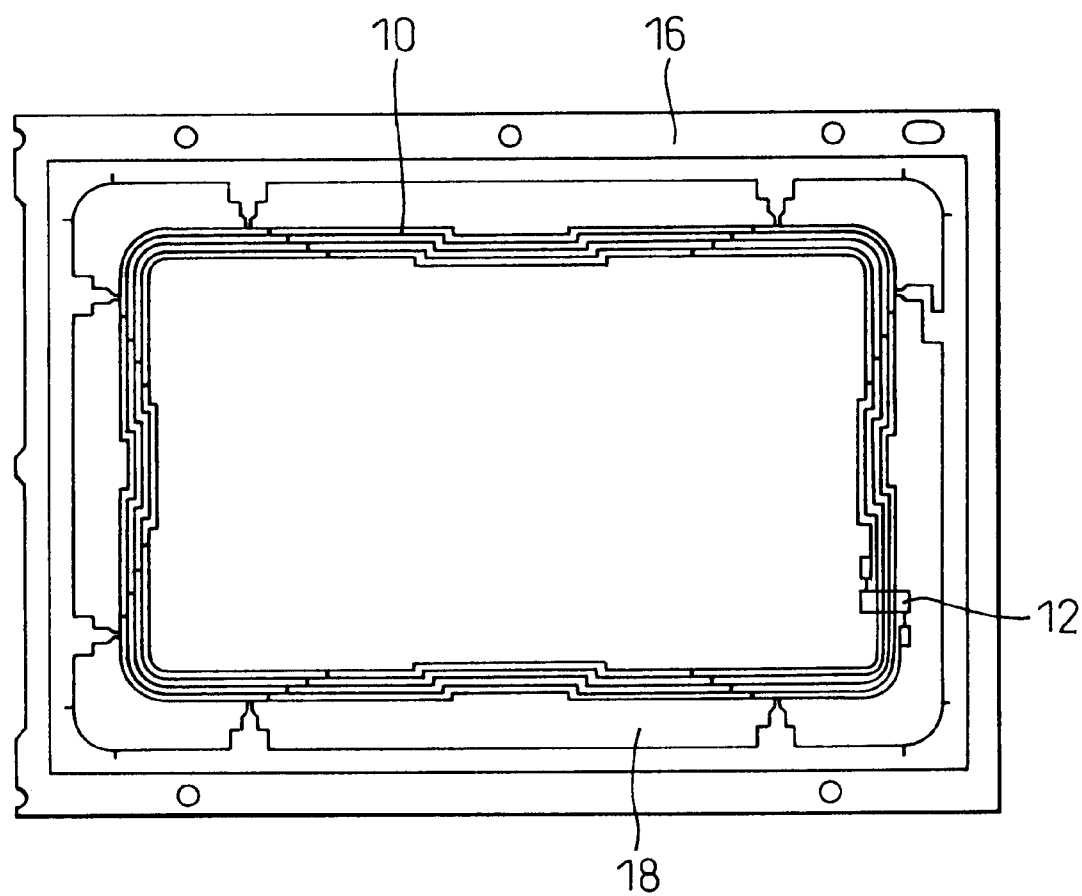
FIG. 17 is a plan view showing a state in which an antenna is held when a protective film is laminated on both sides of the antenna by a conventional method.

FIG. 15 is a view showing an outline of a device for laminating a long piece of the biodegradable resin 50 onto the antenna 10 by thermally pressing the biodegradable resin 50 with rollers. Reference numerals 50a, 50b are rolls of the biodegradable resin 50 which are formed when a long piece of the sheet-shaped biodegradable resin 50 is rolled up, and reference numerals 80a, 80b are rollers used for thermally pressing the long piece of the sheet-shaped biodegradable resin 50. Since the biodegradable resin 50 is melted at low temperatures, it is easy to laminate the biodegradable resin 50 on the antenna 10 by the thermal pressing method in which the rollers 80a, 80b are used.

The method of laminating the antenna 10 with the sheet-shaped biodegradable resin 50 as shown in FIG. 15 is advantageous in that the device structure can be made so simple that the manufacturing line can be easily accomplished and further the antenna 10 can be continuously laminated so that the line structure can be made effective. When the manufacturing line is provided, it is possible to make the antenna 10 into a reel-shape. Further, when the biodegradable resin 50 is formed into a sheet-shape, it becomes possible to suppress fluctuation of the film thickness. Therefore, when the sheet thickness of the biodegradable resin 50 is changed, the strength for fixing the antenna 10 can be easily changed.

In this connection, the biodegradable resin 50 is not necessarily used in the form of a sheet, for example, it is possible to hold the antenna 10 by using the granular biodegradable resin 50. In the case of using the granular biodegradable resin 50, the granular biodegradable resin 50 is melted with a thermal press, and the antenna 10 is interposed, under pressure, via the melted biodegradable resin 50. Due to the foregoing, the antenna 10 can be held with a thin sheet-shaped biodegradable resin 50. The method of holding the antenna 10 with the granular biodegradable resin 50 is advantageous in that the antenna 10 can be positively filled with the biodegradable resin 50 when it is compared with the method of laminating with the sheet-shaped biodegradable resin 50. Further, the granular biodegradable resin 50 is less expensive than the sheet-shaped biodegradable resin 50.

Concerning another method of utilizing the biodegradable resin 50, the biodegradable resin 50 is dissolved in organic solvent so that the biodegradable resin 50 is made to be paste-like, and a thus formed paste-like biodegradable resin 50 is coated on the antenna 10 with a dispenser. In the case where the paste-like biodegradable resin 50 is used, it is necessary to take time for drying the paste-like biodegradable resin 50. However, when the program of the dispenser is changed, it is possible to easily cope with a product, the card size of which is different, and a tag product apart from the IC card, and further, it is possible to appropriately select the coating pattern. The paste-like biodegradable resin 50 easily gets into the antenna, so that the antenna 10 can be positively held.

The solubilities of the biodegradable resins shown on Table 1 with respect to inorganic solvent are as follows.

TABLE 2

| Solvent | Solubility | Solvent | Solubility |
|---|---|---|---|
| Toluene | Δ–x | Diethyl ether | x |
| Xylene | x | Ethyl Cellosolve | ○ |
| Acetone | ○ | Butyl Cellosolve | ○ |
| MEK | ○ | Methanol | x |
| Cyclohexanone | ○–Δ | Ethanol | x |
| Ethyl acetate | ○ | Methylene chloride | ○ |
| n-butyl acetate | ○ | Chloroform | ○ |

On Table 2, reference mark ○ represents a state of complete dissolution, reference mark Δ represents a state of difficult dissolution to partial dissolution, and reference mark x represents a state of only swelling to non-dissolution.

When an antenna is held by biodegradable resin in the manufacturing process of an IC card as explained above, the following advantages can be provided. When the antenna is conveyed after it has been formed into a predetermined pattern by means of punching or etching, it is possible to prevent the antenna from being deformed. When the antenna is held by using a biodegradable resin, it is possible to provide an IC card not affecting the natural environment when the IC card is discarded. In this connection, the method of holding the antenna by using biodegradable resin can be applied to not only the IC card but also a tag product used for distinguishing baggage or other articles. Especially, biodegradable resin made from corn can be mass-produced at low cost. Therefore, it can be effectively used for manufacturing IC cards.

According to the IC card and the method of manufacturing the IC card of the present invention, when biodegradable resin is used for a support member, which supports an antenna so as to prevent the deformation and displacement of the antenna, in the manufacturing process of the IC card, the IC card can be discarded, in safety and at low cost, without affecting the natural environment. Further, when the film, which is arranged outside the antenna and card, is made of material which can be easily decomposed, it is possible to provide an IC card, the safety of which is high, which can be easily discarded.

What is claimed is:

1. An IC card comprising:
   a semiconductor element;
   an antenna electrically connected to said semiconductor element; and
   a supporting material for supporting said semiconductor element and said antenna, said supporting material being made of biodegradable resin.

2. An IC card as set forth in claim 1, wherein said antenna is made of a material which can be easily oxidized and eroded.

3. An IC card as set forth in claim 2, wherein said antenna is made of iron.

4. An IC card as set forth in claim 1, wherein said antenna is a flat coil wound several times having an inner vacant area.

5. An IC card as set forth in claim 4, wherein a whole surface of said flat coil including said inner vacant area is entirely supported by said supporting material.

6. An IC card as set forth in claim 4, wherein the whole surface of said flat coil except for said inner vacant area is entirely supported by said supporting material.

7. An IC card as set forth in claim 4 further comprising a pair of films laminated to respective surfaces of said flat coil and said semiconductor element to form outer surfaces of said IC card and said pair of films are made of biodegradable resin or paper.

8. A method for manufacturing an IC card comprising the following steps of:
   mounting a semiconductor element on an antenna and electrically connecting said semiconductor element to said antenna; and
   supporting said semiconductor element and said antenna by means of a supporting material made of biodegradable resin.

9. A method as set forth in claim 8, wherein said supporting material is made of liquid-like or paste-like biodegradable resin, said method further comprising:
   coating said antenna with said supporting material.

10. A method as set forth in claim 8, wherein said supporting material is made of granular biodegradable resin, said method further comprising:
    melting said supporting material to support said antenna.

11. A method for manufacturing an IC card, wherein said antenna is a flat coil wound several times and having an inner vacant area, said method comprising the following steps of:
    mounting a semiconductor element on said flat coil and electrically connecting said semiconductor element to said flat coil;
    arranging a pair of supporting sheets made of biodegradable resin over respective sides of said flat coil and said semiconductor element; and
    pressing said pair of supporting sheets toward said flat coil and said semiconductor element.

12. A method as set forth in claim 11, further comprising a step of:
    laminating a pair of films, made of biodegradable resin or paper, to respective surfaces of said flat coil and said semiconductor element to form external surfaces of said IC card.

13. An antenna frame used for an IC card comprising:
    an antenna formed as a flat coil wound several times having an inner vacant area, said antenna being made by punching or etching a thin metal strip and having an outermost loop partially connected to and supported by an outer frame of said thin metal strip, and said antenna having respective innermost and outermost terminals;
    one of said innermost and outermost terminals having an accommodation hole in which a semiconductor element is to be accommodated; and
    supporting material for supporting said antenna to maintain its shape, said supporting material being made of biodegradable resin.

14. An IC card comprising:
    an antenna formed as a flat coil wound several times having an inner vacant area, said antenna being made by punching or etching a thin metal strip and having an outermost loop partially connected to and supported by an outer frame of said thin metal strip, and said antenna having respective innermost and outermost terminals;

a semiconductor element electrically connected to said innermost and outermost terminals, respectively;

one of said innermost and outermost terminals having an accommodation hole in which said semiconductor element is accommodated; and supporting material for supporting said semiconductor element and said antenna to maintain their form, said supporting material being made of biodegradable resin.

15. An IC card as set forth in claim 14, further comprising a wiring pattern film for electrically connecting terminals of said semiconductor element to said innermost and outermost terminals of the antenna, respectively.

16. An IC card as set forth in claim 14 further comprising a pair of films laminated to respective surfaces of said flat coil and said semiconductor element to form external surfaces of said IC card and said pair of films are made of biodegradable resin or paper.

* * * * *